US007761393B2

(12) United States Patent
Macbeth et al.

(10) Patent No.: US 7,761,393 B2
(45) Date of Patent: Jul. 20, 2010

(54) CREATING AND MANAGING ACTIVITY-CENTRIC WORKFLOW

(75) Inventors: Steven W. Macbeth, Snohomish, WA (US); Roland L. Fernandez, Woodinville, WA (US); Brian R. Meyers, Issaquah, WA (US); Desney S. Tan, Kirkland, WA (US); George G. Robertson, Seattle, WA (US); Nuria M. Oliver, Seattle, WA (US); Oscar E. Murillo, Seattle, WA (US); Elin R. Pedersen, Seattle, WA (US); Mary P. Czerwinski, Woodinville, WA (US); Jeanine E. Spence, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 244 days.

(21) Appl. No.: 11/426,827

(22) Filed: Jun. 27, 2006

(65) Prior Publication Data

US 2007/0299795 A1    Dec. 27, 2007

(51) Int. Cl.
    *G06E 1/00* (2006.01)
    *G06E 3/00* (2006.01)
(52) U.S. Cl. .......................... 706/16; 709/205; 717/107
(58) Field of Classification Search ........................ None
    See application file for complete search history.

(56) References Cited

U.S. PATENT DOCUMENTS

| 5,737,728 | A  | 4/1998  | Sisley et al. |
| 6,112,243 | A  | 8/2000  | Downs et al. |
| 6,513,031 | B1 | 1/2003  | Fries et al. |
| 6,571,215 | B1 | 5/2003  | Mahapatro |
| 6,727,914 | B1 | 4/2004  | Gutta |
| 6,799,208 | B1 | 9/2004  | Sankaranarayan et al. |
| 7,020,652 | B2 | 3/2006  | Matz et al. |
| 7,058,947 | B1 | 6/2006  | Raja et al. |
| 7,062,510 | B1 | 6/2006  | Eldering |
| 7,194,685 | B2 | 3/2007  | Morrison |
| 7,363,282 | B2 | 4/2008  | Karnawat et al. |
| 2001/0040590 | A1 | 11/2001 | Abbott et al. |
| 2003/0046401 | A1 | 3/2003  | Abbott et al. |
| 2003/0130979 | A1 | 7/2003  | Matz et al. |

(Continued)

OTHER PUBLICATIONS

Bardram. "Activity-Based Computing—Lessons Learned and Open Issues" (Apr. 20, 2004) 1st International Workshop on Computer Support for Human Tasks and Activities, 5 pages.

(Continued)

*Primary Examiner*—Donald Sparks
*Assistant Examiner*—Kalpana Bharadwaj
(74) *Attorney, Agent, or Firm*—Shook, Hardy & Bacon LLP

(57) ABSTRACT

A system that can identify, create, update and/or process a workflow based upon a current, past or future activity is disclosed. A 'workflow' can be defined as an activity flow that includes interaction with, or assignment of work to, people, devices, or services by a single individual or a group of individuals. Once a workflow is determined in accordance with the innovation, the system can inform other users or groups that are performing, or intend to perform, a similar or like activity. In establishing the workflow, the innovation can operate in an ad hoc or authored manner. As well, the system can employ a combination of either ad hoc or authored mechanisms in establishment of the workflow.

19 Claims, 10 Drawing Sheets

U.S. PATENT DOCUMENTS

| | | |
|---|---|---|
| 2003/0135384 A1* | 7/2003 | Nguyen .................... 705/1 |
| 2004/0261026 A1 | 12/2004 | Corson |
| 2005/0080625 A1 | 4/2005 | Bennett et al. |
| 2005/0086046 A1 | 4/2005 | Bennett |
| 2005/0091098 A1 | 4/2005 | Brodersen et al. |
| 2005/0097559 A1 | 5/2005 | He |
| 2005/0144004 A1 | 6/2005 | Bennett et al. |
| 2006/0004680 A1 | 1/2006 | Robarts et al. |
| 2006/0010206 A1 | 1/2006 | Apacible et al. |
| 2006/0015387 A1 | 1/2006 | Moore et al. |
| 2006/0015479 A1 | 1/2006 | Wood et al. |
| 2006/0048059 A1 | 3/2006 | Etkin |
| 2006/0106497 A1 | 5/2006 | Ishikawa et al. |
| 2006/0107219 A1 | 5/2006 | Ahya et al. |
| 2006/0195411 A1 | 8/2006 | Knight et al. |
| 2006/0241997 A1* | 10/2006 | Bhatawdekar et al. ......... 705/9 |
| 2007/0067199 A1 | 3/2007 | Shine et al. |
| 2007/0106497 A1 | 5/2007 | Ramsey et al. |
| 2007/0118804 A1 | 5/2007 | Raciborski et al. |
| 2007/0191979 A1 | 8/2007 | Zeng et al. |
| 2007/0219798 A1 | 9/2007 | Wang et al. |

OTHER PUBLICATIONS

NonFinal Office Action, U.S. Appl. No. 11/426,804, mailed Jul. 15, 2008, 11 pgs.

Final Office Action, U.S. Appl. No. 11/426,804, mailed Jan. 16, 2009, 11 pgs.

NonFinal Office Action, U.S. Appl. No. 11/426,804, mailed Jul. 9, 2009, 12 pgs.

NonFinal Office Action, U.S. Appl. No. 11/426,810, mailed Jul. 11, 2008, 10 pgs.

Final Office Action, U.S. Appl. No. 11/426,810, mailed Jul. 31, 2008, 12 pgs.

NonFinal Office Action, U.S. Appl. No. 11/426,796, mailed May 13, 2009, 20 pgs.

NonFinal Office Action, U.S. Appl. No. 11/426,846, mailed Jun. 19, 2009, 13 pgs.

NonFinal Office Action, U.S. Appl. No. 11/426,839, mailed Sep. 19, 2008, 17 pgs.

Final Office Action, U.S. Appl. No. 11/426,839, mailed Feb. 26, 2009, 19 pgs.

NonFinal Office Action, U.S. Appl. No. 11/426,846, mailed Jul. 11, 2008, 10 pgs.

Final Office Action, U.S. Appl. No. 11/426,846, mailed Jan. 12, 2009, 11 pgs.

Final Office Action, mailed Dec. 28, 2009, in U.S. Appl. No. 11/426,796, 33 pgs.

Final Office Action, mailed Jan. 6, 2010, in U.S. Appl. No. 11/426,846, 11 pgs.

NonFinal Office Action—U.S. Appl. No. 11/426,810 mailed Nov. 3, 2009, 10 pgs.

* cited by examiner

CREATING AND MANAGING ACTIVITY-CENTRIC WORKFLOW

CROSS REFERENCE TO RELATED APPLICATIONS

This application is related to U.S. Ser. No. 11/426,846 filed on Jun. 27, 2006, entitled "LOGGING USER ACTIONS WITHIN ACTIVITY CONTEXT"; Ser. No. 11/426,839 filed on Jun. 27, 2006, entitled "RESOURCE AVAILABILITY FOR USER ACTIVITIES ACROSS DEVICES"; Ser. No. 11/426,832 filed on Jun. 27, 2006, entitled "CAPTURE OF PROCESS KNOWLEDGE FOR USER ACTIVITIES"; Ser. No. 11/426,830 filed on Jun. 27, 2006, entitled "PROVIDING USER INFORMATION TO INTROSPECTION"; Ser. No. 11/426,818 filed on Jun. 27, 2006 and entitled "MONITORING GROUP ACTIVITIES"; Ser. No. 11/426,810 filed on Jun. 27, 2006, entitled "MANAGING ACTIVITY-CENTRIC ENVIRONMENTS VIA USER PROFILES"; Ser. No. 11/426,804 filed on Jun. 27, 2006, entitled "ACTIVITY-CENTRIC ADAPTIVE USER INTERFACE"; Ser. No. 11/426,796 filed on Jun. 27, 2006, entitled "ACTIVITY-CENTRIC DOMAIN SCOPING"; and Ser. No. 11/426,788 filed on Jun. 27, 2006, entitled "ACTIVITY-CENTRIC GRANULAR APPLICATION FUNCTIONALITY". The entirety of each of the above applications is incorporated herein by reference.

BACKGROUND

Conventionally, communications between humans and machines has not been natural. Human-human communication typically involves spoken language combined with hand and facial gestures or expressions, and with the humans understanding the context of the communication. Human-machine communication is typically much more constrained, with devices like keyboards and mice for input, and symbolic or iconic images on a display for output, and with the machine understanding very little of the context. For example, although communication mechanisms (e.g., speech recognition systems) continue to develop, these systems do not automatically adapt to the activity of a user. As well, traditional systems do not consider contextual factors (e.g., user state, application state, environment conditions) to improve communications and interactivity between humans and machines.

Activity-centric concepts are generally directed to ways to make interaction with computers more natural (by providing some additional context for the communication). Traditionally, computer interaction centers around one of three pivots, 1) document-centric, 2) application-centric, and 3) device-centric. However, most conventional systems cannot operate upon more than one pivot simultaneously, and those that can do not provide much assistance managing the pivots. Hence, users are burdened with the tedious task of managing every little aspect of their tasks/activities.

A document-centric system refers to a system where a user first locates and opens a desired data file before being able to work with it. Similarly, conventional application-centric systems refer to first locating a desired application, then opening and/or creating a file or document using the desired application. Finally, a device-centric system refers to first choosing a device for a specific activity and then finding the desired application and/or document and subsequently working with the application and/or document with the chosen device.

Accordingly, since the traditional computer currently has little or no notion of activity built in to it, users are provided little direct support for translating the "real world" activity they are trying to use the computer to accomplish and the steps, resources and applications necessary on the computer to accomplish the "real world" activity. Thus, users traditionally have to assemble "activities" manually using the existing pieces (e.g., across documents, applications, and devices). As well, once users manually assemble these pieces into activities, they need to manage this list mentally, as there is little or no support for managing this on current systems.

All in all, the activity-centric concept is based upon the notion that users are leveraging a computer to complete some real world activity. Historically, a user has had to outline and prioritize the steps or actions necessary to complete a particular activity mentally before starting to work on that activity on the computer. Conventional systems do not provide for systems that enable the identification and decomposition of actions necessary to complete an activity. In other words, there is currently no integrated mechanism available that can dynamically understand what activity is taking place as well as what steps or actions are necessary to complete the activity.

Most often, the conventional computer system has used the desktop metaphor, where there was only one desktop. Moreover, these systems stored documents in a single filing cabinet. As the complexity of activities rises, and as the similarity of the activities diverges, this structure does not offer user-friendly access to necessary resources for a particular activity.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises a system that can identify, create and/or process a workflow based upon a current, past or future activity. As used herein, a 'workflow' can be defined as an activity that includes interaction with, or assignment of work to, people, devices, or services by a single individual or a group of individuals. A 'workflow' can refer to an activity with defined states and associated roles. Examples of a 'workflow' are a meeting, document review, issue tracking, and proposal drafting that involve input from several people and are sent to an external service for delivery.

A 'workflow' can reference, monitor and track the movement of documents (e.g., resources) and/or tasks (e.g., activities) through a work process. As well, a 'workflow' can address the operational aspect of a work procedure, for example, how tasks are structured, who performs them, their temporal sequencing (e.g., serial as well as parallel orders), and particularly important, how information flows between sub-tasks (e.g., components of activities).

Workflows are defined in activity templates (or in active activities, using ad hoc templates) by making a step (or task) in the activity assignable. Assignment metadata includes, but is not limited to identification of assigned resource (e.g., the person this step is assigned to), role identification (e.g., "Proposal Reviewer"), objects related to the step (e.g., the proposal document), the status of the step, the value of the approval or grading given by the assignee, the value of the approval or grading given by the assignor, the history of the step, annotations associated with the step, and policies that control how the step is "advertised" and how assignments are made.

Workflows can be machine generated, human authored, or human authored with machine assistance.

Assignable steps within an activity that are currently unassigned can optionally be made visible (e.g., thru a web service) to those resources (e.g., people, devices, web services) that are qualified to perform them. The innovation also provides users with a "search for tasks" UI to allow them to search for tasks they can perform.

Likewise, resources qualified to perform an assignable task can be searched thru a web service. An associated "search for resources to perform this task" UI is provided for this also.

Assignment policies are support explicit assignment by step/task owner, and assignment by resource with optional owner approval.

The innovation also supports a bidding system so that several resources can bid on a task and the owner can choose (explicitly or thru policy) the resource to award the task to.

In addition, the system supports the attachment of a contract to a step. The contract data can include a description of the work to be done, the level of quality expected, the time allotted, and the payment/credit (if any) to be remitted to the resource if the work is accepted by the owner.

Once a workflow is determined in accordance with the innovation, the system can analyze the past, current, and future activities and workflow of a group of people and provide various reports, views, and tools to help manage the workflow and reduce the risk of the activity associated with the activity. For example, the system can show an activity owner all of the assigned steps his activities are waiting on, estimate completion dates based on current workloads and historical completion times, and help him send reminder mail to the assignees. In addition, a resource worker can see all of the activities that are waiting on him (to complete their steps that are assigned to him), which high priority activities are blocked (or soon to be blocked) by him, etc.

In addition, the system can inform other users or groups that are performing, or intend to perform, a similar or like activity. The activities can include abstract or concrete activities (e.g., content known). In addition to considering the activity itself, the system can factor the objectives and outcomes of similar activities to in order to effectively address current activity goals.

The system can further perform group activity detection and/or prediction together with associated workflows. For example, temporal and/or spatial analysis can be employed to assist with group activity management. Additionally, data content can be employed to perform group activity detection and/or prediction—as such, content of targeted advertising can be employed to communicate with a group of people engaged in a particular activity such as discussing a particular topic. Similarly, social activities such as dating, car pooling, etc. can be overlaid upon social networks in accordance with a particular activity.

Resource balancing can be enabled by detecting and/or consolidating activities. Factors such as productivity related to temporal factors, type of tasks, etc. can be considered and employed to optimize performance. Similarly, performance (e.g., training, review, delegation) can be monitored by providing a cascaded task view. The system can provide support for delegated, shared (e.g., available to multiple users) and group (e.g., applicable to multiple users) tasks. In an example, if a task is delegated from a manager to an employee and/or shared between individuals, the system can enable a real-time view of the status of the task based upon roles.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
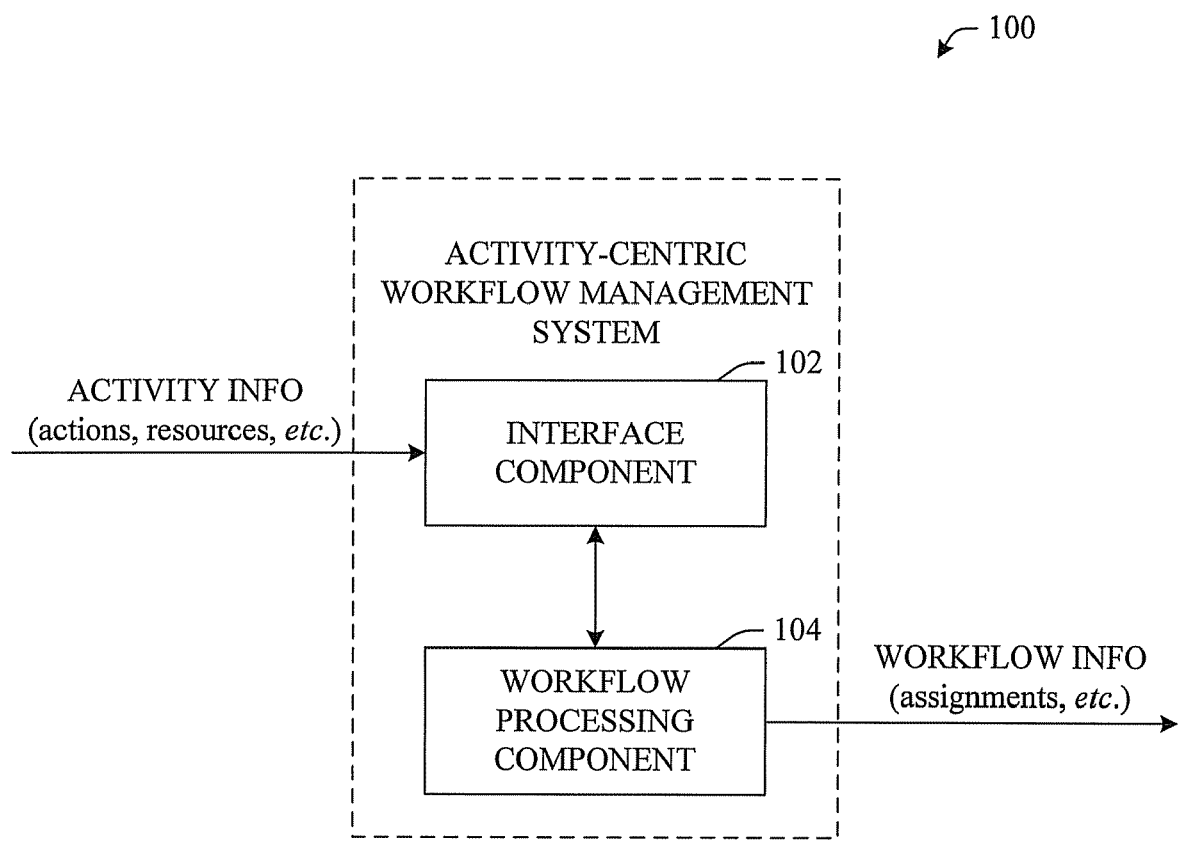
FIG. 1 illustrates a system that processes an activity-centric workflow in accordance with an aspect of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via sensors, events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to the drawings, FIG. 1 illustrates a system 100 that facilitates management of activity-centric workflows in accordance with an aspect of the innovation. Generally, system 100 can include an interface component 102 that accesses activity information (e.g., actions, resources) and a workflow processing component 104 that establishes, locates and/or updates a workflow as a function of the activity information. Effectively, the system 100 can identify, create and/or process a workflow based upon a current, past or future activity.

As used herein, a 'workflow' can be defined as an activity that includes interaction with, or assignment of work to, people, devices, or services by a single individual or a group of individuals. In other words, a 'workflow' can refer to an activity with defined states and associated roles. Examples of a 'workflow' are a meeting, a document review, an issue tracking, and a proposal that involve input from several people and are sent to an external service for delivery.

A 'workflow' can reference the movement of documents (e.g., resources) and/or tasks (e.g., activities) through a work process. As well, a 'workflow' can address the operational aspect of a work procedure, for example, how tasks are structured, who performs them, their temporal sequencing (e.g., serial as well as parallel orders), and particularly important, how information flows between sub-tasks (e.g., components of activities).

Once a workflow is determined in accordance with the innovation, the system 100 can facilitate locating and informing other users or groups that are performing, or intend to perform, a similar or like activity. The activities can include abstract or concrete activities (e.g., content known). In addition to considering the activity itself, the system 100 can factor the objectives and outcomes of similar activities in order to effectively address current activity goals. As well, the system can factor synchronous (together) as well as asynchronous (apart) activities to determine appropriate activity consolidation and/or similarity. It will be appreciated that an activity log can be employed to obtain information about current actions as well as related activities. In other words, an activity log can be employed to access the activity information which is processed by the workflow processing component 104.

The system 100 can further perform group activity detection and/or prediction with respect to associated workflows. For example, temporal and/or spatial analysis can be employed to determine a workflow as well as to identify related workflows. Additionally, content analysis can be employed to perform group activity identification and/or prediction. As such, targeted advertising can be sent to a group of people engaged in a particular activity such as discussing a particular topic. Similarly, social activities such as dating, car pooling, etc. can be overlaid upon social networks in accordance with a particular activity. In aspects, devices such as cell phones, personal data assistants (PDAs), smartphones, etc. can be employed to transmit and/or communicate activity and/or profile data and information.

In operation, the system 100 can perform resource balancing by detecting and/or consolidating activities. Factors such as productivity related to temporal factors can be considered and employed to optimize performance. For instance, if a particular user works better at a particular time of day, the workflow processing component 104 can organize the workflow taking into account particular temporal factor(s) in view of the actions and resources associated with a particular activity.

Moreover, system 100 can be used to facilitate display of the workflow information. In an aspect, performance (e.g., training, review, delegation) can be monitored via a cascaded task view. In another example, the system 100 can provide support for delegated, shared and group tasks, for example, if a task is delegated from a manager to an employee and/or shared between individuals, the system can enable a real-time view of the status of the task based upon roles, user identification, group, etc.

Figure 2:
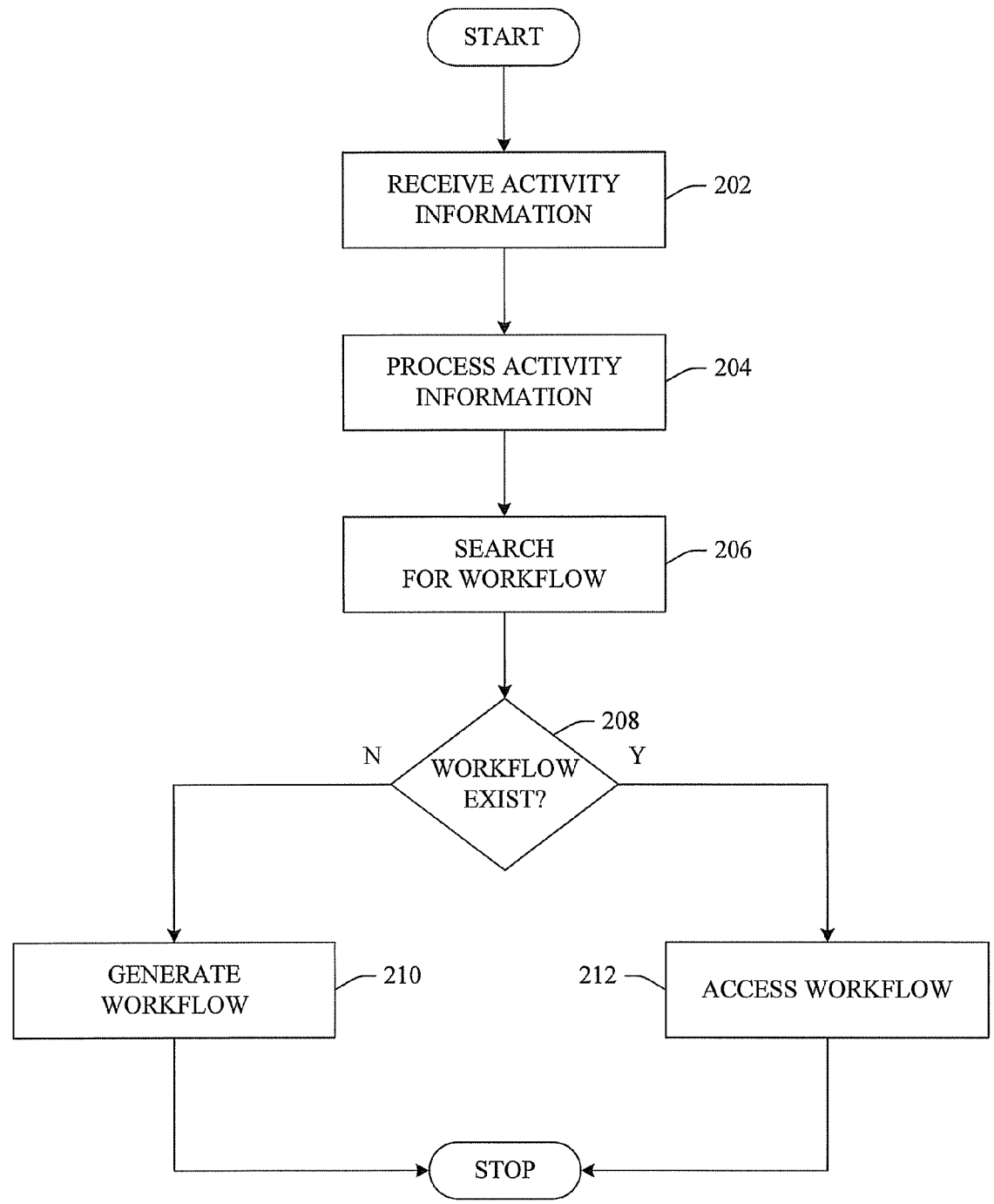
FIG. 2 illustrates an exemplary flow chart of procedures that facilitate locating and/or generating a workflow in accordance with an aspect of the innovation.

FIG. 2 illustrates a methodology of generating a workflow in accordance with an aspect of the innovation. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 202, activity information (tasks, actions, resources, etc.) is accessed or received. As described supra, in one aspect, the activity information can be accessed from an activity log. As such, the methodology can include an act that dynamically monitors the activity log(s) in order to access the activity information.

At 204, the activity information is processed in order to identify a workflow. Next, at 206, a search is conducted for a workflow. Accordingly, this search can be conducted for an exact match to the workflow or for a workflow related to a similar activity. A determination can be made at 208 if an associated workflow exists.

If at 208, a determination is made that a workflow does not exist, a workflow can be generated at 210 with respect to the activity. On the other hand, if a workflow is located by the search act at 206, the workflow can be accessed at 212. Moreover, it is to be understood that, if necessary, the located workflow can be copied, modified, updated, appended, etc. in order to correspond to the activity from 202.

Figure 3:
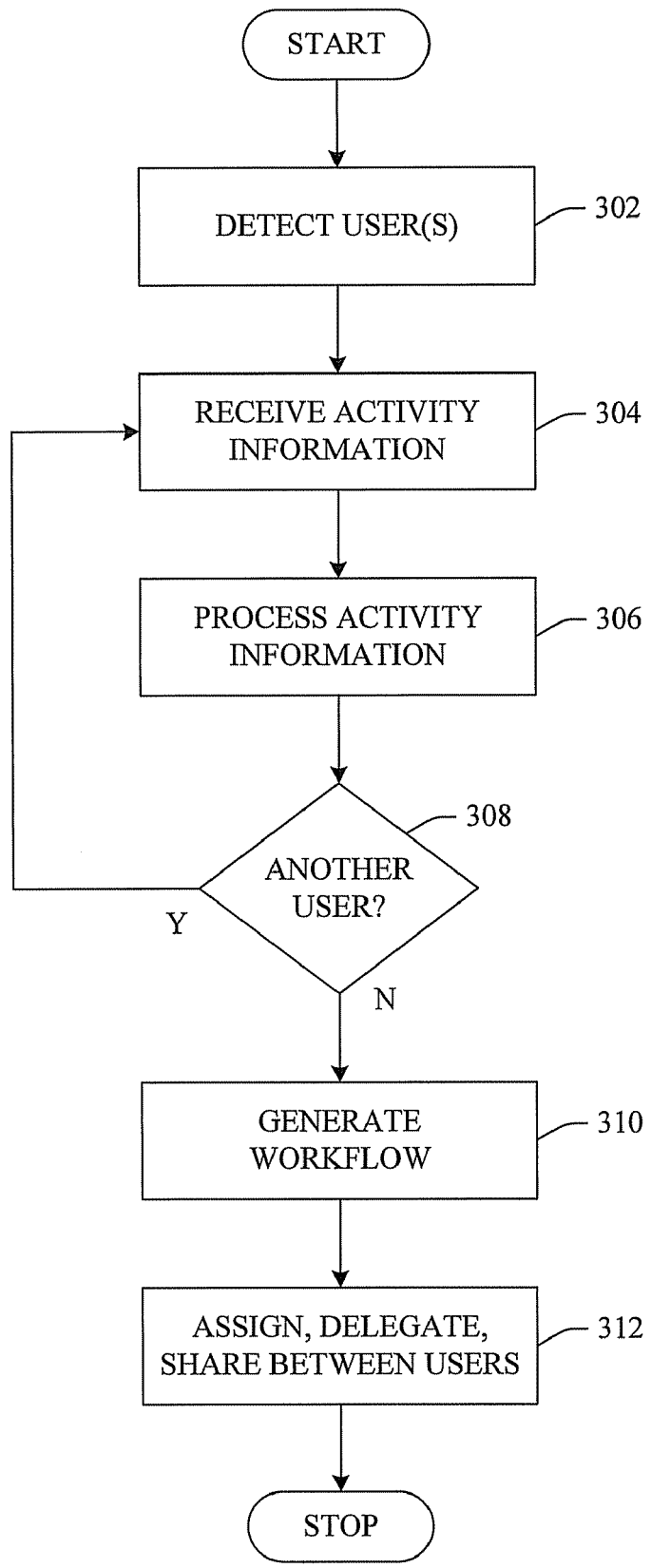
FIG. 3 illustrates an exemplary flow chart of procedures that facilitate employing a workflow with multiple individuals in accordance with an aspect of the innovation.

Turning now to FIG. 3, a methodology of generating a multi-user workflow in accordance with an aspect of the innovation is shown. At 302, users are detected and/or identified with respect to an activity. As described with reference to FIG. 2, the users can be identified by interrogating an activity log or monitoring actions. As well, users can be identified explicitly. In other words, a user can explicitly identify engagement and/or participation in a particular activity.

At 304, activity information can be received or accessed. Again, this information can be accessed from an activity log or dynamically by monitoring actions in real-time. In another aspect, once the users associated to an activity are identified at 302, the actions and resources accessed by the users can be dynamically monitored. In either case, the activity information can be processed at 306. For example, information can be clustered, stored, and/or indexed with respect to a user, context, state, and/or activity.

At 308, a determination can be made if another user exists with respect to an activity. It is to be understood and appreciated that this determination enables an activity user list to dynamically update with respect to an activity. In other words, as users become available or engage in an activity, a determination can be made of the presence of the user. Accordingly, if another user is available, activity information is received at 304 and the process repeats. This decision block at 308 illustrates the recursive characteristics of the methodology of FIG. 3.

If another user is not available, a workflow can be generated at 310. As described with respect to FIG. 2, alternatively, a search can be conducted to identify a workflow. As well, if a workflow is located, the workflow can be updated, modified, revised, etc. with respect to the activity information. At 312, workflow tasks, actions and/or resources can be assigned, delegated and/or shared between the identified activity users (e.g., members).

Since the same user could be assigned to multiple steps within an activity, it is to be understood that a search can be conducted for "assignable steps" within an activity. As additional data for the identified step, the innovation could note which users (or other types of resources) were assigned to the step, over the various past instances of the activity.

Figure 4:
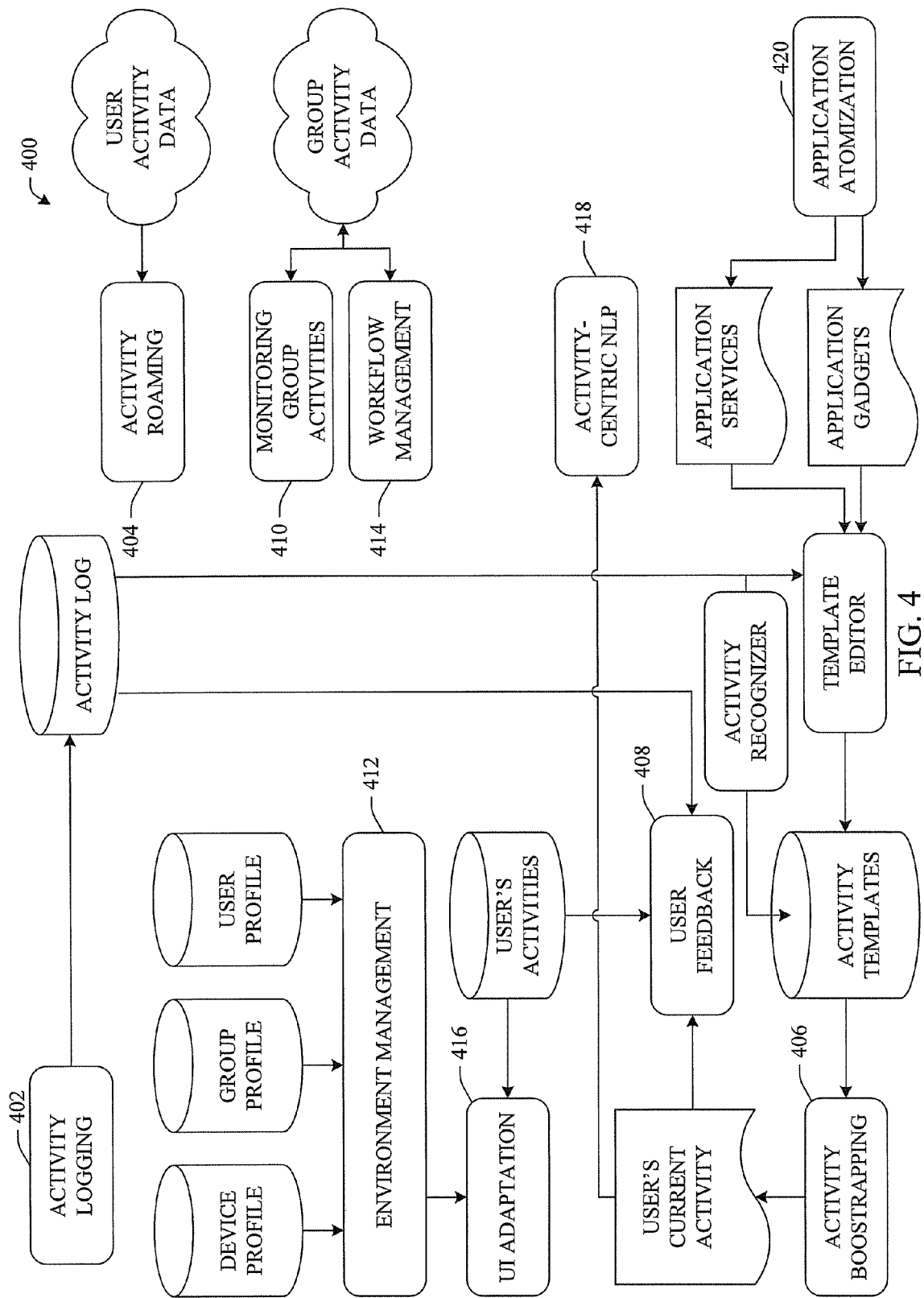
FIG. 4 illustrates a component diagram of an overall activity-centric system in accordance with an aspect of the innovation.

Turning now to FIG. 4, an overall activity-centric system 400 operable to perform novel functionality described herein is shown. As well, it is to be understood that the activity-centric system of FIG. 4 is illustrative of an exemplary system capable of performing the novel functionality of the Related Applications identified supra and incorporated by reference herein. Novel aspects of each of the components of system 400 are described below.

The novel activity-centric system 400 can enable users to define and organize their work, operations and/or actions into units called "activities." Accordingly, the system 400 offers a user experience centered on those activities, rather than pivoted based upon the applications and files of traditional systems. The activity-centric system 400 can also usually include a logging capability, which logs the user's actions for later use.

In accordance with the innovation, an activity typically includes or links to all the resources needed to perform the activity, including tasks, files, applications, web pages, people, email, and appointments. Some of the benefits of the activity-centric system 400 include easier navigation and management of resources within an activity, easier switching between activities, procedure knowledge capture and reuse, improved management of activities and people, and improved coordination among team members and between teams.

As described herein and illustrated in FIG. 4, the system 400 discloses an extended activity-centric system. However, the particular innovation (e.g., creating and managing activity-centric workflows) disclosed herein is part of the larger, extended activity-centric system 400. An overview of this extended system 400 follows.

The "activity logging" component 402 can log the user's actions on a device to a local (or remote) data store. By way of example, these actions can include, but are not limited to include, resources opened, files changed, application actions, etc. As well, the activity logging component 402 can also log current activity and other related information. This data can be transferred to a server that holds the user's aggregated log information from all devices used. The logged data can later be used by the activity system in a variety of ways.

The "activity roaming" component 404 is responsible for storing each of the user's activities, including related resources and the "state" of open applications, on a server and making them available to the device(s) that the user is currently using. As well, the resources can be made available for use on devices that the user will use in the future or has used in the past. The activity roaming component 404 can accept activity data updates from devices and synchronize and/or collaborate them with the server data.

The "activity boot-strapping" component 406 can define the schema of an activity. In other words, the activity boot-strapping component 406 can define the types of items it can contain. As well, the component 406 can define how activity templates can be manually designed and authored. Further, the component 406 can support the automatic generation, and tuning of templates and allow users to start new activities using templates. Moreover, the component 406 is also responsible for template subscriptions, where changes to a template are replicated among all activities using that template.

The "user feedback" component 408 can use information from the activity log to provide the user with feedback on his activity progress. The feedback can be based upon comparing the user's current progress to a variety of sources, including previous performances of this or similar activities (using past activity log data) as well as to "standard" performance data published within related activity templates.

The "monitoring group activities" component 410 can use the log data and user profiles from one or more groups of users for a variety of benefits, including, but not limited to, finding experts in specific knowledge areas or activities, finding users that are having problems completing their activities, identifying activity dependencies and associated problems, and enhanced coordination of work among users through increased peer activity awareness.

The "environment management" component 412 can be responsible for knowing where the user is, the devices that are physically close to the user (and their capabilities), and helping the user select the devices used for the current activity. The component 412 is also responsible for knowing which remote devices might be appropriate to use with the current activity (e.g., for processing needs or printing).

The "workflow management" component 414 can be responsible for management and transfer of work items that involve other users or asynchronous services. The assignment/transfer of work items can be ad-hoc, for example, when a user decides to mail a document to another user for review. Alternatively, the assignment/transfer of work items can be structured, for example, where the transfer of work is governed by a set of pre-authored rules. In addition, the workflow manager 414 can maintain an "activity state" for workflow-capable activities. This state can describe the status of each item in the activity, for example, which it is assigned to, where the latest version of the item is, etc.

The "UI adaptation" component 416 can support changing the "shape" of the user's desktop and applications according to the current activity, the available devices, and the user's skills, knowledge, preferences, policies, and various other factors. The contents and appearance of the user's desktop, for example, the applications, resources, windows, and gadgets that are shown, can be controlled by associated information within the current activity. Additionally, applications can query the current activity, the current "step" within the activity, and other user and environment factors, to change their shape and expose or hide specific controls, editors, menus, and other interface elements that comprise the application's user experience.

The "activity-centric recognition" component or "activity-centric natural language processing (NLP) component 418 can expose information about the current activity, as well as user profile and environment information in order to supply context in a standardized format that can help improve the recognition performance of various technologies, including speech recognition, natural language recognition, optical character recognition, gesture recognition, desktop search, and web search.

Finally, the "application atomization" component 420 represents tools and runtime to support the designing of new applications that consist of services and gadgets. This enables more fine-grained UI adaptation, in terms of template-defined desktops, and well as adapting applications. The services and gadgets designed by these tools can include optional rich behaviors, which allow them to be accessed by users on thin clients, but deliver richer experiences for users on devices with additional capabilities.

In accordance with the activity-centric environment 400, once the computer understands the activity, it can adapt to that activity. For example, if the activity is the review of a multi-media presentation, the application can display the information differently as opposed to an activity of the UI employed in creating a multi-media presentation. All in all, the computer can react and tailor functionality and the UI characteristics based upon a current state and/or activity. The system 400 can understand how to bundle up the work based upon a particular activity. Additionally, the system 400 can monitor actions and automatically bundle them up into an appropriate activity or group of activities. The computer will also be able to associate a particular user to a particular activity, thereby further personalizing the user experience.

In summary, the activity-centric concept of the subject system 400 is based upon the notion that users can leverage a computer to complete some real world activity. As described supra, historically, a user would outline and prioritize the steps or actions necessary to complete a particular activity mentally before starting to work on that activity on the computer. In other words, conventional systems do not provide for systems that enable the identification and decomposition of actions necessary to complete an activity.

The novel activity-centric systems enable automating knowledge capture and leveraging the knowledge with respect to previously completed activities. In other words, in one aspect, once an activity is completed, the subject innovation can infer and remember what steps were necessary when completing the activity. Thus, when a similar or related activity is commenced, the activity-centric system can leverage this knowledge by automating some or all of the steps necessary to complete the activity. Similarly, the system could identify the individuals related to an activity, steps necessary to complete an activity, documents necessary to complete, etc. Thus, a context can be established that can help to complete the activity next time it is necessary to complete. As well, the knowledge of the activity that has been captured can be shared with other users that require that knowledge to complete the same or a similar activity.

Historically, the computer has used the desktop metaphor, where there was effectively only one desktop. Moreover, conventional systems stored documents in a filing cabinet where, there was only one filing cabinet. As the complexity of activities rises, and as the similarity of the activities diverges, it can be useful to have many desktops available that can utilize identification of these similarities in order to streamline activities. Each individual desktop can be designed to achieve a particular activity. It is a novel feature of the innovation to build this activity-centric infrastructure into the operating system such that every activity developer and user can benefit from the overall infrastructure.

The activity-centric system proposed herein is made up of a number of components as illustrated in FIG. 4. It is the combination and interaction of these components that compromises an activity-centric computing environment and facilitates the specific novel functionality described herein. At the lowest level the following components make up the core infrastructure that is needed to support the activity-centric computing environment; Logging application/user actions within the context of activities, User profiles and activity-centric environments, Activity-centric adaptive user interfaces, Resource availability for user activities across multiple devices and Granular applications/web-services functionality factoring around user activities. Leveraging these core capabilities with a number of higher-level functions are possible, including; providing user information to introspection, creating and managing workflow around user activities, capturing ad-hoc and authored process and technique knowledge for user activities, improving natural language and speech processing by activity scoping, and monitoring group activity.

Figure 5:
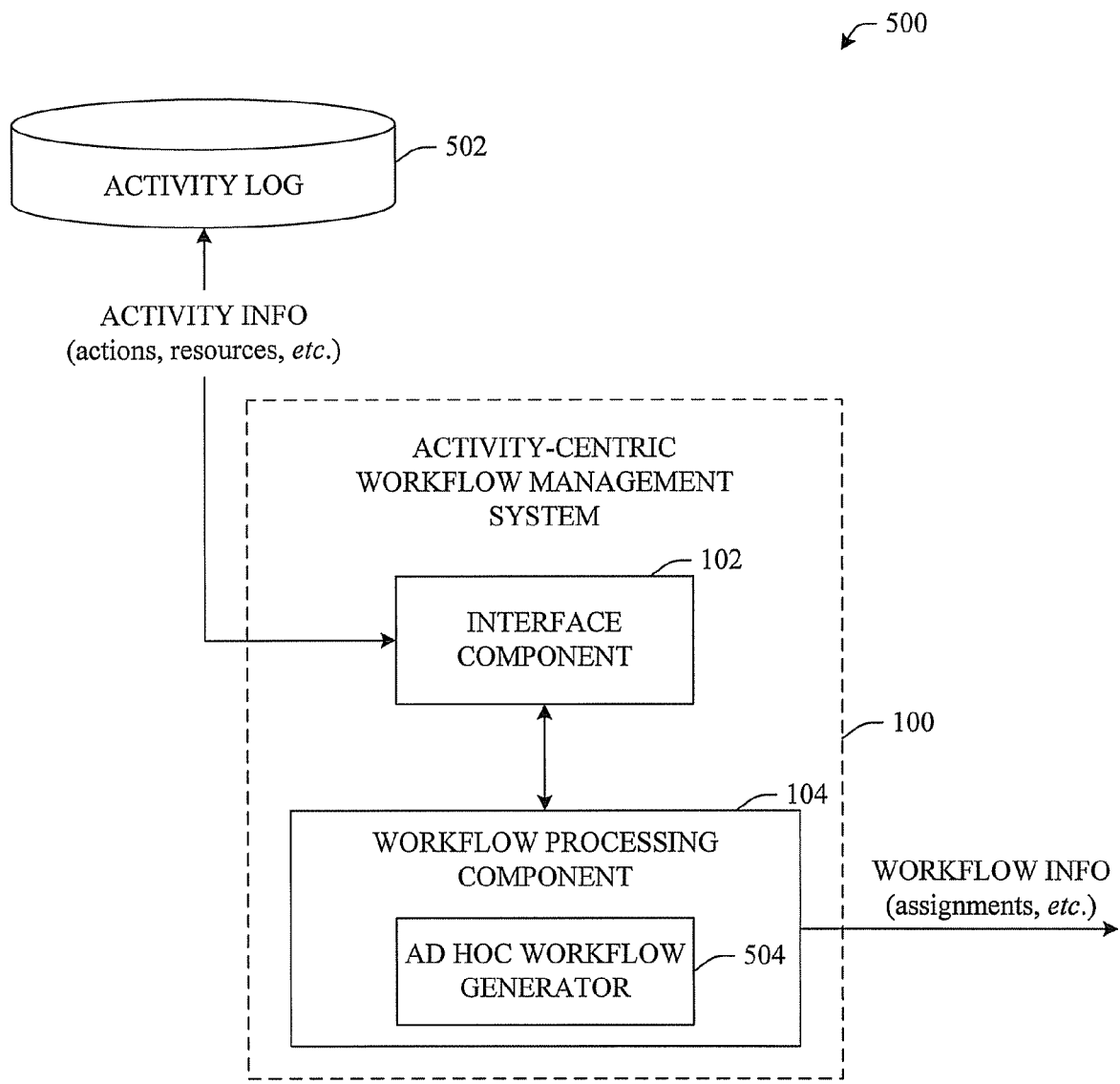
FIG. 5 illustrates a block diagram of an ad hoc system that processes a workflow in accordance with an aspect of the innovation.

Turning now to FIG. 5, a system 500 that facilitates establishing a workflow in accordance with an aspect of the innovation is shown. Generally, system 500 can include an activity-centric workflow management system 100 and an activity log 502. As described with reference to FIG. 1, the activity-centric workflow management system 100 can include an interface component 102 and a workflow processing component 104. The interface component 102 can access activity information from the activity log 502. In aspects, the interface component 102 can facilitate dynamic monitoring of the activity log 502. As well, in other aspects, the interface component 102 can be employed to access activity information at a desired interval or upon command.

In accordance with the innovation, it is to be understood that a workflow can be viewed as a process flow defined within (or that defines) an activity. Essentially, 'workflow' in accordance with the innovation can be viewed in at least two ways: 'ad hoc' workflow and 'authored' workflow. Referring first to the ad hoc workflow, this type of workflow generation infers and/or derives the activity information based upon available information. For instance, the system can monitor a user, or group of users, thereby gathering activity information that can be used to establish a workflow.

System 500 illustrates an ad hoc workflow mechanism where the workflow processing component 104 includes an ad hoc workflow generator. The ad hoc workflow generator can monitor user actions and dynamically create and/or update a workflow as a function of the obtained activity information. By way of further example, as a user goes through a day working on specific actions and activities, the ad hoc workflow generator can dynamically piece together the workflow that is normally used to accomplish a certain activity or alternatively, locate an activity that might suggest a workflow given the monitored items.

Turning to the authored workflow, a structured or authored workflow refers to the scenario where a user or third-party either creates a starting point for a workflow or defines some definitive structure for the workflow. For example, there may be some regulatory entity that establishes a policy that governs how interaction is to occur around a particular process (e.g., activity). The regulatory entity might be a third party that is generating a 'best-practices' approach as to how to manage a project. Frequently, an enterprise may want its employees to perform a task in a particular way. For example, establishing a standard way to perform budgeting can inherently enable the sharing of knowledge associated with the particular activity.

Whether authored or ad hoc, the policy or workflow can essentially be a checklist of tasks to perform with respect to completion of an activity, some of which can be performed in parallel or which must be done serially with a defined order of the actions. It is to be understood that, in aspects, the defined order can be circular.

Moreover, the workflow can have defined states for the items, roles associated with items and persons, or devices assigned to the items. The workflow can also define how information is to flow from one entity (e.g., user, group, organization, device) to another within the task.

In another aspect, a workflow can be edited to create more structure or refine the structure, hence becoming a hybrid between an ad hoc workflow and a structured or authored workflow. For example, some steps in an ad hoc workflow may have been extraneous, or performed in a sub-optimal order. Allowing the workflow to be edited to remove the extraneous steps or to re-order the steps can create a more effective workflow. Likewise, a step in a structured workflow can sometimes need to be overridden or edited by a user or a supervisor, for example, as permitted by the policy or policies in effect.

An example of an ad hoc workflow can be directed to budgeting. In accordance with the budgeting activity, there are a number of processes that are somewhat repetitive from year to year. For example, there can be a number of resources to work on, a number of meetings to call, reports to run and distribute, etc. each of which is repetitive from year to year. It is to be understood that the first time this budgeting activity takes place the tasks and/or actions can be identified and established in an ad hoc manner. Thus, in future budgeting activities, the user can repeat steps and utilize appropriate resources thus streamlining the process.

Figure 6:
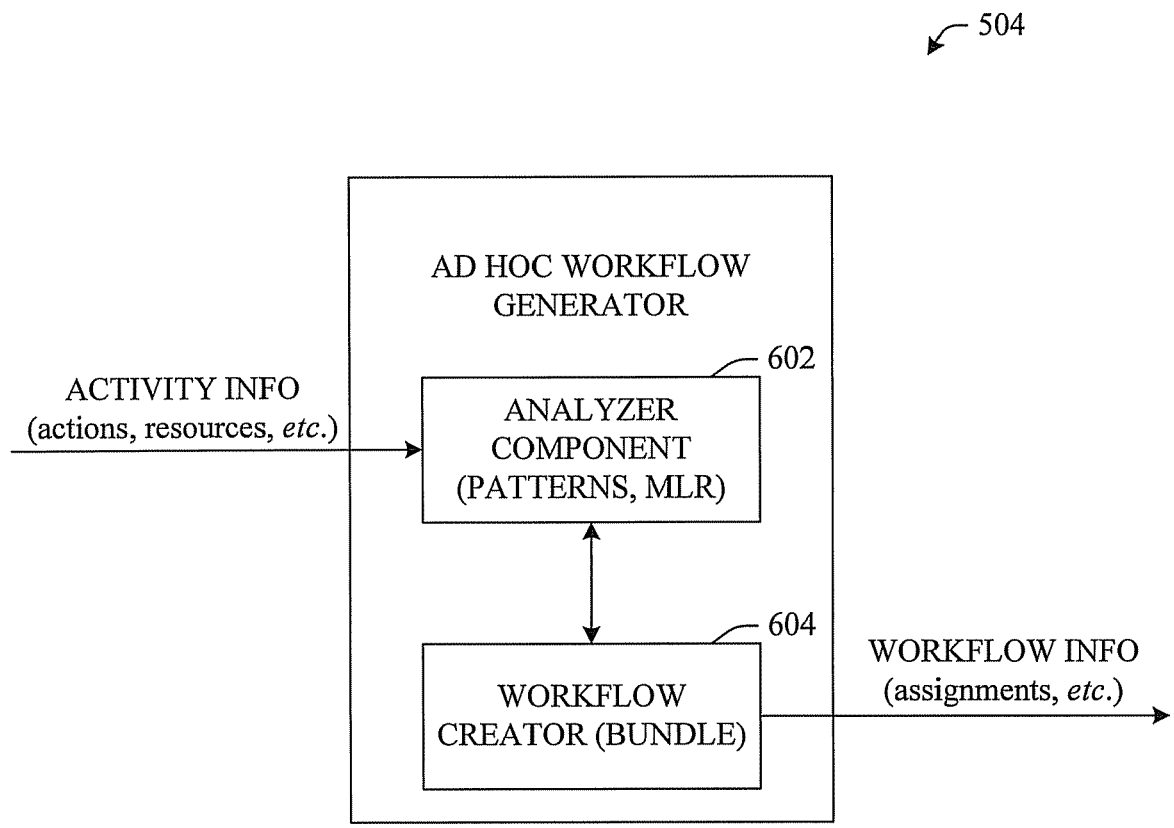
FIG. 6 illustrates a block diagram of an ad hoc workflow generator in accordance with an aspect of the innovation.

FIG. 6 illustrates a block diagram of an ad hoc workflow generator 504 in accordance with an aspect of the innovation. Generally, the ad hoc workflow generator 504 can include an analyzer component 602 and a workflow creator 604. These components (602, 604) can facilitate inferring and/or determining a workflow based upon gathered activity information.

In operation, the analyzer component 602, can recognize the common patterns of actions and use of resources thereafter bundling the actions and resources together. As well, the analyzer component 602 can employ machine learning and reasoning (MLR) mechanisms to learn what the workflow process entails or should entail. This analysis and generation can be accomplished without a need for a user to explicitly define a system to support a particular workflow.

The MLR aspects of the analyzer component 602 can facilitate automating one or more features in accordance with the subject innovation. The subject innovation (e.g., in connection with workflow generation) can employ various AI-based schemes for carrying out various aspects thereof. For example, a process for determining which actions and/or resources should be incorporated into an activity workflow can be facilitated via an automatic classifier system and process. Moreover, the MLR mechanisms can be employed to determine the flow (e.g., order, policy) and/or relationship of the actions and resources within a workflow.

A classifier is a function that maps an input attribute vector, $x=(x1, x2, x3, x4, xn)$, to a confidence that the input belongs to a class, that is, $f(x)=confidence(class)$. Such classification can employ a probabilistic, statistical and/or decision theoretic-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. By defining and applying a kernel function to the input data, the SVM can learn a non-linear hypersurface. Other directed and undirected model classification approaches include, e.g., decision trees, neural networks, fuzzy logic models, naïve Bayes, Bayesian networks and other probabilistic classification models providing different patterns of independence can be employed.

As will be readily appreciated from the subject specification, the innovation can employ classifiers that are explicitly trained (e.g., via a generic training data) as well as implicitly trained (e.g., via observing user behavior, receiving extrinsic information). For example, the parameters on an SVM are estimated via a learning or training phase. Thus, the classifier (s) can be used to automatically learn and perform a number of functions, including but not limited to determining according to a predetermined criteria what steps and/or resources should be included within a workflow as well as what the relationship between them is appropriate for a given activity or group of activities.

Figure 7:
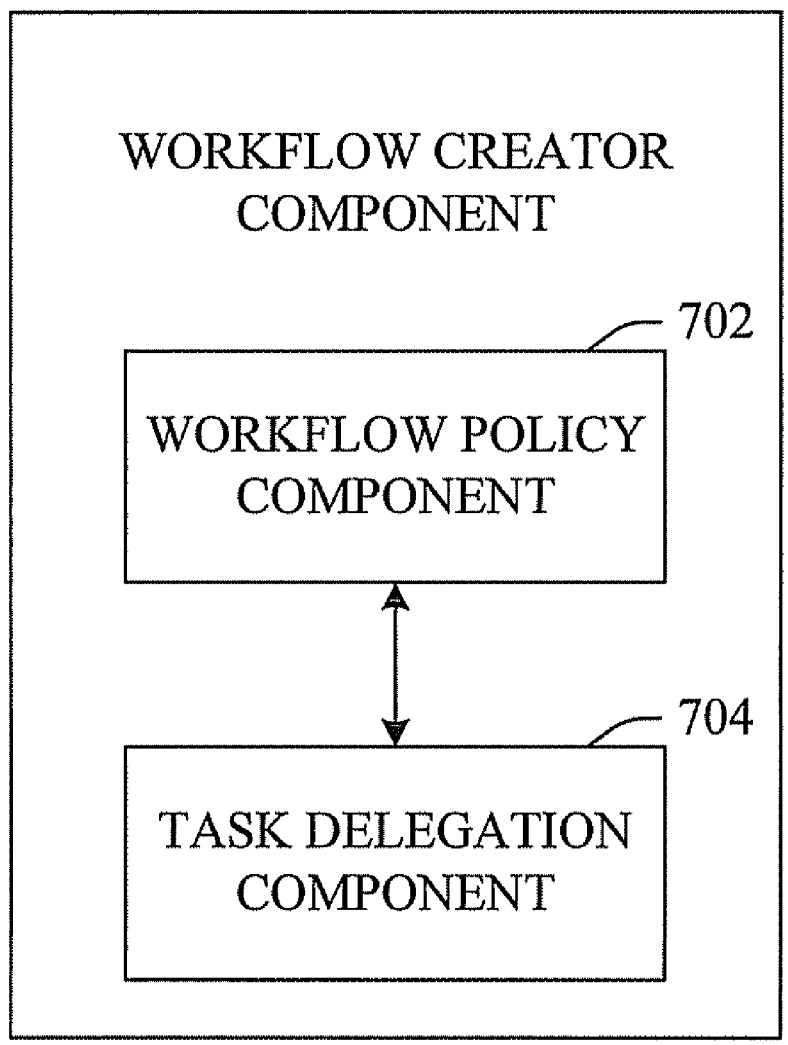
FIG. 7 illustrates a block diagram of a workflow creator component in accordance with an aspect of the innovation.

Referring now to FIG. 7, a block diagram of a workflow creator component 604 in accordance with an aspect of the innovation is shown. Generally, the workflow creator component 604 can include a workflow policy component 702 and a task delegation component 704.

As described above, the innovation can include an activity monitoring mechanism that can dynamically identify actions and/or resources associated with an activity. The workflow policy component 702 can be employed to define how the actions and/or resources are interrelated. For example, the workflow policy component 702 can identify if actions are to be interconnected in a serial or parallel with respect to an activity. As well, it is to be understood that the workflow policy component 702 can consider context (e.g., user context, activity context, environment context) as well as other factors (e.g., extrinsic data, device profile) in establishing and/or implementing policies and rules.

With respect to workflow, generally, the steps can involve multiple individuals (or other types of resources, like devices or web services). Thus, the concept of workflow can include a delegation and assignment aspect of work between multiple individuals in order to streamline processing and improve efficiency. The task delegation component 704 can be employed to determine how/if a task or group of tasks are to be delegated (or assigned) to an individual or group of individuals in view of an activity.

Figure 8:
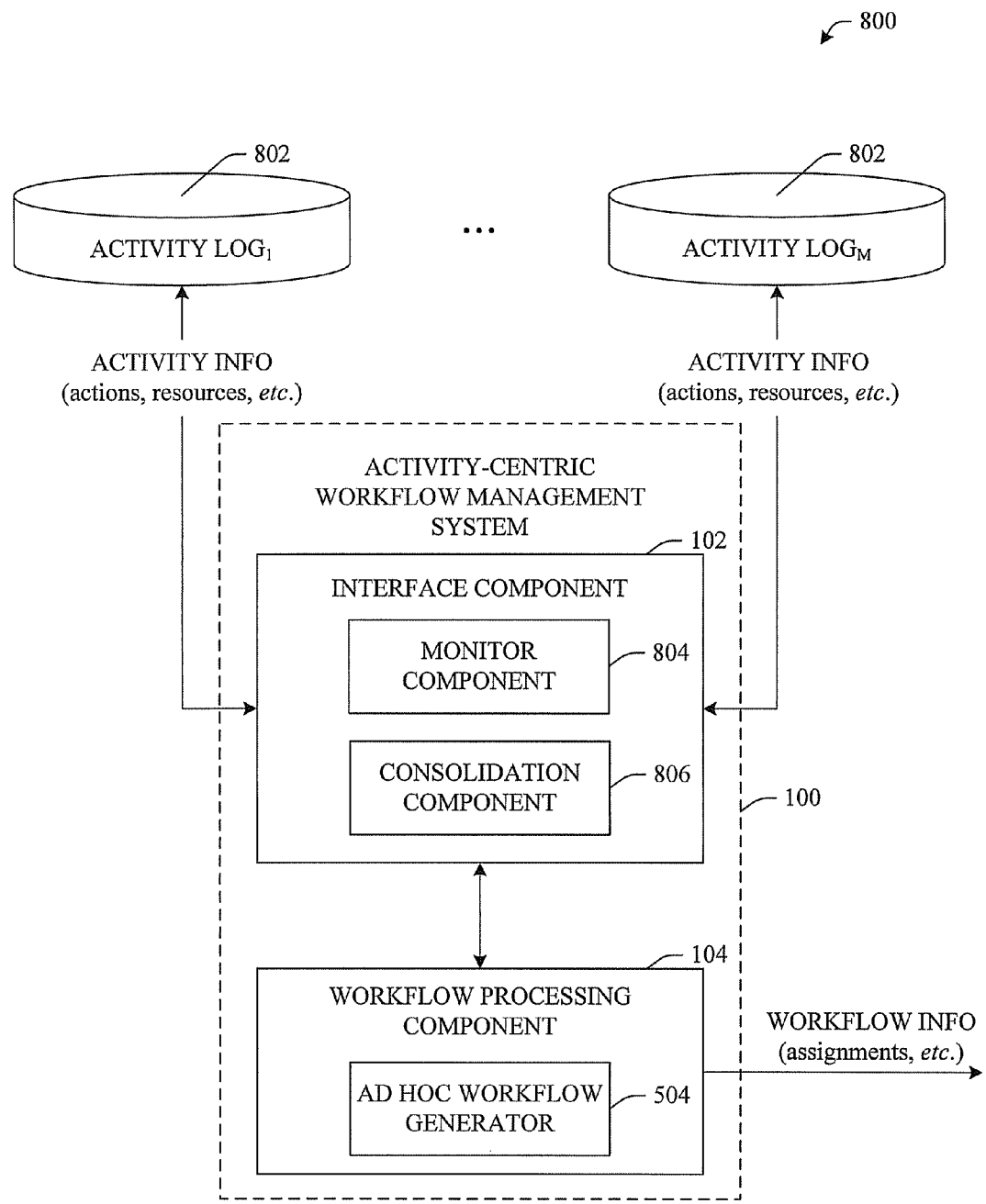
FIG. 8 illustrates a block diagram of a system that facilitates processing activity information from multiple activity logs in accordance with an aspect of the innovation.

FIG. 8 illustrates an alternative system 800 that facilitates generating an activity-centric workflow in accordance with an aspect of the innovation. Generally, system 800 includes an activity-centric workflow management component system 100 and 1 to M activity log components, where M is an integer. It is to be understood that 1 to M activity log components can be referred to individually or collectively as activity log components 802. It is further to be appreciated that a subset of these activity log components 802 can be located remotely from the other of activity log components 802.

With continued reference to FIG. 8, the interface component 102 can include a monitoring component 804 and a consolidation component 806. In operation, the monitoring component 804 can facilitate dynamic monitoring of the activity log components 802 thereby identifying tasks and resources associated with an activity. The consolidation component 806 can be employed to aggregate or cluster tasks or activities related to a particular activity. In a specific example, the consolidation component 806 can be employed to cluster activity information based upon context (e.g., activity context, user context, environment context). Thereafter, the workflow processing component 104 can be employed to establish an appropriate workflow and policy (if applicable).

One particularly novel feature of the innovation is the ability to analyze a dynamic set of constraints and understand and move some of the pressure from pre-authoring a particular workflow from a user onto the ad hoc system. As described supra, the system 800 can dynamically control flow by allowing and/or prohibiting action based upon a given policy. As well, in operation, it is possible that one action can update the status of another action. Here, this activity context can allow a user to have a richer set of constraints since they dynamically adjust with the state of the activity.

Once the system or a user updates and/or modifies a workflow, the system 800 can determine if/how the workflow affects work previously done. In other words, the system 800 can determine if a change will impact actions or steps that have already been completed. Additionally, the system 800 can infer future activities and/or actions and determine any impact upon these future actions/activities.

When using the ad hoc mechanism to establish a workflow, the system can be employed to analyze actions of groups of employees to determine if duplicate work is being performed. For example, as shown in FIG. 8, the system 800 can receive information from multiple activity logs 802 thereby comparing information received. As well, the system 800 can determine an optimal way to streamline the work in order to achieve maximum productivity. Other metrics can be compared such as, time to complete, cost of process, availability of individuals, etc. The results can be factored into the process workflow for an activity by the ad hoc workflow generator.

In a specific example, a manager in an organization can employ the system 800 to watch or audit employees in an effort to improve quality and/or efficiency of a particular process. Here, the system 800 can be employed to provide this feedback such that a manager can make decisions based upon personnel, scheduling, etc.

One particular type of workflow is a cascading workflow. A cascading workflow can refer to mandatory training or review processes. Generally, this type of workflow can be employed in a scenario where a manager gets a task, performs the task, and assigns the task to their employees, etc. Here, the system enables viewing of all the levels within a workflow, and assigning individual viewing boundaries across an organization. The innovation is particularly useful in tracking and monitoring at the highest levels where there are many levels beneath.

The functionality of the innovation can also be employed from a social perspective in addition to a personal perspective. In one example, suppose a user is restoring an automobile to its original condition and has performed a large amount of research with respect to the restoration. As will be appreciated, this research may be of interest to other individuals that are performing a similar activity. Thus, the subject innovation can be employed to share knowledge socially with this group of individuals. Here, in addition to explicitly telling the system 800 that a user is performing a particular activity, the system 800 can monitor and infer the activity. Thereafter, the system 800 can determine others that are performing a same or similar activity thereafter notifying them of the common activity.

Essentially, the system 800 can provide for mechanisms to bring people who are performing similar activities together to either just communicate or to actually work on an activity together. For example, suppose a group of people are planning on attending a conference, the system 800 can identify a group of proximally located individuals that are planning to visit the conference. As such, the system 800 can facilitate suggestion of car pooling and other sharing of resources (e.g., hotels) between the people.

In other examples, the system 800 can automatically perform data mining of activity logs 802 in order to determine best practices to perform an activity. The results can be employed to effectively leverage expertise to the novice in a particular area. In specific examples, the system 800 can be employed to assist in buying a car, a house, etc. It is to be understood that the number of scenarios and examples where the innovation can be employed are countless. As such, it is to be understood that the scenarios described herein are provided to add perspective to the innovation and are not intended to limit the innovation in any way.

Moreover, the system 800 can be employed to determine capabilities (and availabilities) of users and to automatically allocate (e.g., delegate) tasks to a group of people that are available to perform a particular activity. For example, if a manager has a software coding project, the project can be allocated to a pool of coders in the most cost effective and efficient manner in view of the criteria involved with the activity taking into account availability, wage rate, roles, etc.

In aspects, notification and communication options can be employed once it is determined that others are working on a same or similar task. Thus, cost can be saved by determining the most cost effective person to assign a task based upon available persons. For example, if a person is already engaged within a similar activity, it might be appropriate to assign the task to that person as they would not have to make a context switch since they are already engaged within the activity.

Another feature of the innovation is the relationship between the items (e.g., files, web links, resources) within the activity system and the actual item a user is working on. If it is determined that the items are either very similar or the same, the system 800 can provide for a much more powerful project management system. In one aspect, project files can be updated in real time. For example, the system 800 can monitor (e.g., via monitor component 804) how long a task takes and update, in real time, how long it will take to complete an activity, etc. Essentially, the system 800 can enable many powerful workflow estimating tools such as, how long would it takes to complete, how long would an average person take to complete, or how long would it take a particular person to complete.

It is to be understood that at least four types of tasks are generally performed in a workflow system, general tasks, assigned tasks, delegated tasks and shared tasks. A 'general' task refers to an action that a user decides or wants to complete. An 'assigned' task refers to a task that is assigned to a user, service, or device. Frequently, a user creates a task and assigns it to themselves in these cases. A 'delegated' task refers to the situation when a task has been assigned to a user and the user wants to reassign it to someone else. A 'shared' task refers to a task that is being worked on by multiple people. In other words, the user invites someone to work on a task with them. The subject innovation can be employed in connection with most any type of task.

As described supra, the innovation can provide for self-management such that a user can set or establish a policy (e.g., 704 of FIG. 7) with respect to a workflow. If the state of the workflow, or a task within the workflow deviates from the policy, the system can notify a user or take some other specified action. One example of a policy use is time management. If a task becomes stale, the system (e.g., via workflow policy component 704) can remind a user to direct attention to this particular task such that the workflow is not interrupted.

The system 800 can be employed in an 'asynchronous' or 'synchronous' collaborative manner. For example, 'asynchronous' collaboration refers to the scenario where there are multiple people working on an activity but they are not working on the same action all of the time. More specifically, this scenario refers to the situation where two or more users are working on multiple documents related to the same activity. 'Synchronous' collaboration refers to multiple people working on the same document, task or action at the same time. Not only can the system 800 share the task from a conceptual and work item perspective but, the system 800 can actually share the work with respect to the task. As such, multiple people can work on a task in a synchronized manner.

Moving these functionalities into the business arena, there are a number of ideas that center around this concept of collaborating workflow. In one aspect, the space that is occupied by a group can be described as more of a virtual space. As such, the innovation can maintain collaboration and communication within the context of the activity by facilitating communication within the virtual space.

One particular advantage that the system 800 has is that there can be a direct relationship between the system that is tracking the work item and the work item itself. The innovation combines the awareness of what is going on with the task of the workflow. In addition to employing the activity log(s) 802 to determine what the workflow should be, the innovation can also determine a state within a particular activity or workflow. For example, the system 800 can determine, with respect to the workflow, what steps have been completed, reordered, what steps are important, etc.

Because the ad hoc workflow generator operates dynamically, friction can be reduced by eliminating up front investment by users. This is particularly important because it is known that up front investment can often be a barrier for many users. By the time the investment is made, oftentimes the process has changed. As well, the system 800 can reduce friction by allowing a user to adapt the system 800 based upon real world criteria such as preferences or items that actually change.

If a user is sharing an activity with someone else, the user can control when they receive and/or access the changes to an activity or resource associated therewith. For example, a user might want to accept or defer a change that might affect the process as a whole. In accordance with the innovation, a user can control the workflow of an activity in most any desired manner.

Likewise, a user that is working on a document may not want the changes to be propagated and/or synchronized until the changes are complete. In this scenario, the user can decide to either dynamically flow the changes as they are made or to wait until all changes are made to make the changes public. More specifically, a user could perform multiple document editing sessions (e.g., with multiple saves), without 'publishing' any new versions of the document.

Similarly, a user can restrict the changes to a single machine, group of machines, groups of individuals (e.g., working group), etc. as desired. In a specific example, suppose a user is working on a document with internal company individuals as well as external partners. In this scenario, the user might choose to publish changes ongoing with respect to the internal individuals but, to wait to publish to the external partners until all changes are complete.

Figure 9:
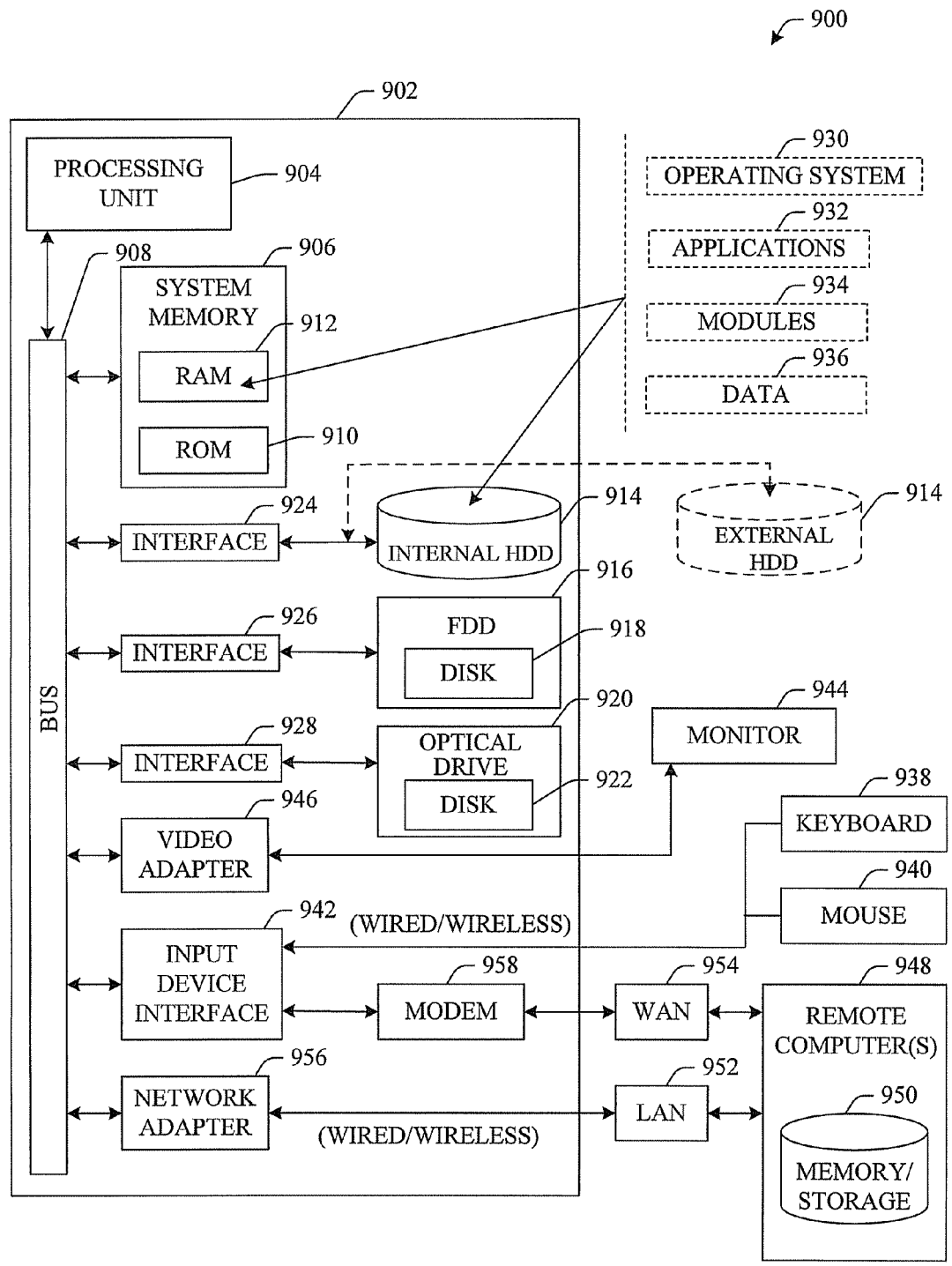
FIG. 9 illustrates a block diagram of a computer operable to execute the disclosed architecture.

Referring now to FIG. 9, there is illustrated a block diagram of a computer operable to execute the disclosed architecture. In order to provide additional context for various aspects of the subject innovation, FIG. 9 and the following discussion are intended to provide a brief, general description of a suitable computing environment 900 in which the various aspects of the innovation can be implemented. While the innovation has been described above in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, the exemplary environment 900 for implementing various aspects of the innovation includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the innovation can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adapter 956 may facilitate wired or wireless communication to the LAN 952, which may also include a wireless access point disposed thereon for communicating with the wireless adapter 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 10:
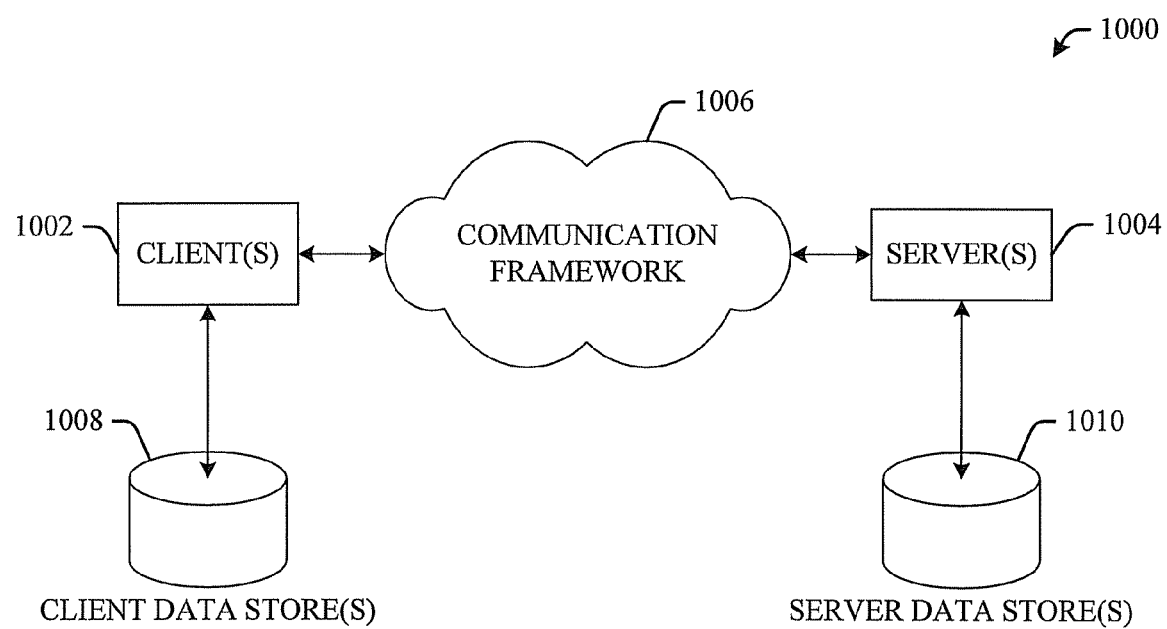
FIG. 10 illustrates a schematic block diagram of an exemplary computing environment in accordance with the subject innovation.

Referring now to FIG. 10, there is illustrated a schematic block diagram of an exemplary computing environment 1000 in accordance with the subject innovation. The system 1000 includes one or more client(s) 1002. The client(s) 1002 can be hardware and/or software (e.g., threads, processes, computing devices). The client(s) 1002 can house cookie(s) and/or associated contextual information by employing the innovation, for example.

The system 1000 also includes one or more server(s) 1004. The server(s) 1004 can also be hardware and/or software (e.g., threads, processes, computing devices). The servers 1004 can house threads to perform transformations by employing the innovation, for example. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. One or more computer-storage media having computer-executable instructions embodied thereon that when executed by a computing device performs a method of generating a workflow, comprising:
   accessing activity information that comprises one or more of tasks, actions, and resources associated with one or more previously completed activities; and
   generating a workflow by analyzing the activity information with a machine learning mechanism to derive the workflow from a pattern identified within the activity information, wherein the workflow includes actions and resources used to complete an activity, wherein the workflow is created by analyzing the activity information apart from an existing workflow.

2. The media of claim 1, wherein the workflow comprises a plurality of at least one of serial and parallel tasks.

3. The media of claim 1, wherein the workflow includes a policy that establishes a path between the plurality of at least one of serial and parallel acts.

4. The media of claim 1, wherein the workflow comprises a plurality of at least one of optional and required steps.

5. The media of claim 1, wherein the workflow comprises at least one of a role and an assignment for a person.

6. The media of claim 1, wherein the workflow comprises a state of at least one of a plurality of acts.

7. The media of claim 1, wherein the workflow includes a policy that establishes a relationship of a plurality of acts defined by the workflow.

8. The media of claim 1, wherein the activity information is accessed from an activity log; and wherein the activity log maintains a plurality of actions and resources associated with the one or more previously completed activities.

9. The media of claim 1, wherein the activity information is dynamically analyzed as the activity information is generated.

10. The media of claim 1, wherein the machine learning mechanism is a support vector machine.

11. The media of claim 1, wherein the machine learning mechanism is a classifier that is implicitly trained by observing the activity information.

12. The media of claim 1, wherein the machine learning mechanism is a classifier that is explicitly trained on training data.

13. The media of claim 1, wherein the method further comprises delegating a task related to the workflow to a user.

14. The media of claim 1, wherein the method further comprises monitoring a state of the workflow with respect to a plurality of users.

15. The media of claim 1, wherein the method further comprises consolidating multi-party activity information; wherein the workflow is based at least in part upon the consolidated multi-party activity information.

16. A computer-implemented method of processing a workflow, comprising:
    accessing activity information from one or more activity log components, wherein the one or more activity log components comprise a remote or local data store, and wherein the activity information comprises one or more of tasks, actions, and resources associated with one or more previously completed activities;
    locating a workflow that corresponds to similar activity information; and
    modifying the workflow to generate the activity-centric workflow as a function of the activity information, wherein the modification are based on differences between analyzed activity information and the workflow.

17. The computer-implemented method of claim 16, further comprising monitoring a plurality of users to establish the activity information.

18. A method that facilitates management of an activity-centric workflow, comprising:
    logging activity information to one or more activity log components, the activity information comprises the tasks, actions, resources, or context associated with an activity;
    dynamically monitoring the logged activity information to identify tasks, actions, resources, or context associated with the activity;
    aggregating or clustering tasks, actions, resources, or context associated with the activity if the identified tasks, actions, resources, or context are located on the activity log components;
    analyzing the identified tasks, actions, resources, or context associated with the activity;

establishing a plurality of activity-centric workflow components from at least a subset of the identified tasks, actions, resources, or context associated with the activity; and creating the activity-centric workflow based at least in part upon a subset of the plurality of activity-centric workflow components using a machine learning mechanism to derive the activity-centric workflow components from a pattern identified within the activity information, wherein the activity-centric workflow is created by analyzing the activity information apart from an existing workflow.

19. The method of claim 18, further comprising monitoring a plurality of sources to identify the tasks, actions, resources, or context associated with the activity.

* * * * *